(12) United States Patent
Kajiura et al.

(10) Patent No.: US 9,752,467 B2
(45) Date of Patent: Sep. 5, 2017

(54) VARIABLE VALVE DEVICE FOR INTERNAL COMBUSTION ENGINES AND VALVE TIMING CONTROL DEVICE

(71) Applicant: HITACHI AUTOMOTIVE SYSTEMS, LTD., Hitachinaka-shi, Ibaraki (JP)

(72) Inventors: Mikihiro Kajiura, Tama (JP); Yosuke Iwase, Yokohama (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 0 days.

(21) Appl. No.: 15/318,416

(22) PCT Filed: Jun. 15, 2015

(86) PCT No.: PCT/JP2015/067124
§ 371 (c)(1),
(2) Date: Dec. 13, 2016

(87) PCT Pub. No.: WO2016/009766
PCT Pub. Date: Jan. 21, 2016

(65) Prior Publication Data
US 2017/0122144 A1    May 4, 2017

(30) Foreign Application Priority Data

Jul. 15, 2014 (JP) ................................. 2014-144652

(51) Int. Cl.
*F01L 1/34* (2006.01)
*F01L 1/352* (2006.01)
(Continued)

(52) U.S. Cl.
CPC ................. *F01L 1/352* (2013.01); *F01L 1/46* (2013.01); *G01D 5/20* (2013.01)

(58) Field of Classification Search
CPC ............... F01L 1/352; F01L 1/46; G01D 5/20
(Continued)

(56) References Cited

U.S. PATENT DOCUMENTS 8,899,197 B2    12/2014  Kokubo et al.
2012/0174883 A1*  7/2012  Kokubo .................. F01L 1/352
                                                                  123/90.15

FOREIGN PATENT DOCUMENTS

JP      08-184405 A      7/1996
JP      2011-226372 A    11/2011

* cited by examiner

*Primary Examiner* — Zelalem Eshete
(74) *Attorney, Agent, or Firm* — Foley & Lardner LLP

(57) ABSTRACT

A variable valve device for an internal combustion engine for varying operating characteristics of engine valves by changing a relative rotational phase of a camshaft to a timing sprocket has an electric motor that rotates the camshaft relatively to the timing sprocket, a cover member provided to cover a front end section of the electric motor, and an angle sensor that detects a rotational angle position of a motor output shaft. The angle sensor includes a detected unit provided inside of a top end section of the motor output shaft and a detecting unit provided on the cover member so as to be opposed to the detected unit through a minute clearance. A metal disk-shaped reinforcing plate is molded and fixed inside of a cover main body of the cover member mainly formed of a synthetic resin material, thus enhancing the entire rigidity of the cover main body.

20 Claims, 12 Drawing Sheets

(51) Int. Cl.
  *F01L 1/46* (2006.01)
  *G01D 5/20* (2006.01)
(58) Field of Classification Search
  USPC ..................................................... 123/90.15
  See application file for complete search history.

VARIABLE VALVE DEVICE FOR INTERNAL COMBUSTION ENGINES AND VALVE TIMING CONTROL DEVICE

TECHNICAL FIELD

The present invention relates to a valve timing control device, which is a variable valve device for an internal combustion engine for controlling valve open timing and valve closure timing of intake valves and/or exhaust valves.

BACKGROUND ART

One such valve timing control device for an internal combustion engine, has been disclosed in the following prior-art Patent document 1, previously filed by the same applicant as the present invention.

In the valve timing control device disclosed in the Patent document 1, a cover member is provided at the front end side of a motor housing of an electric motor with a prescribed clearance. A pair of electricity-feeding slip rings, facing the clearance, are fixed onto the inner face of the cover member. Also provided or installed on an electricity-feeding plate, which is fixed to the front end section of the motor housing, are electricity-feeding brushes in sliding-contact with the respective slip rings for electricity-feeding to coils of the electric motor.

A rotation detection mechanism is provided between one axial end of a motor output shaft of the electric motor, facing the cover member, and the cover member axially opposing to the one axial end, for detecting a rotational angle of the motor output shaft.

The rotation detection mechanism is an electromagnetic induction type, and has a detected unit fixed to the one axial end of the motor output shaft and a detecting unit fixed to the cover member at a position opposed to a top end of the detected unit. A detected rotor, which is fixed to the top end face of the detected unit, is arranged to be opposed to a receiving circuit (a receiving coil) and an oscillating circuit (an oscillation coil) of the detecting unit with a minute clearance.

CITATION LIST

Patent Literature

Patent document 1: JP2011-226372 A

SUMMARY OF INVENTION

Technical Problem

However, in the valve timing control device disclosed in the Patent document 1, the entire cover member is integrally formed of a synthetic resin material, and thus it is impossible to ensure a sufficient rigidity. Therefore, the previously-noted minute clearance between the detecting unit and the detected unit tends to fluctuate owing to driving oscillations (vibrations) transmitted from the internal combustion engine to the cover member. This leads to the drawback of a degradation of the rotation detection accuracy.

It is, therefore, in view of the previously-described drawbacks of the prior art, an object of the invention to provide a valve timing control device for an internal combustion engine capable of suppressing fluctuations in a minute clearance between a detecting unit and a detected rotor by virtue of the increased rigidity of a cover member even when driving oscillations of the internal combustion engine are transmitted to the cover member.

Solution to Problem

In order to accomplish the aforementioned and other objects, according to the present invention, especially, a variable valve device for an internal combustion engine for varying operating characteristics of engine valves by changing a relative rotational phase of a second member to a first member includes an electric motor configured to rotate the second member relatively to the first member by rotating a motor output shaft, a cover member provided to cover at least a part of the electric motor, and a rotational angle detection mechanism constructed by a detected unit provided on the motor output shaft and a detecting unit provided on the cover member so as to be opposed to the detected unit through a minute clearance for detecting a rotational angle position of the motor output shaft, characterized in that the cover member has a synthetic resin material and a deformation suppression member molded inside of the synthetic resin material and having a higher elastic modulus than the synthetic resin material.

Advantageous Effects of Invention

According to the present invention, it is possible to suppress fluctuations in a minute clearance between a detecting unit and a detected rotor by virtue of the increased rigidity of a cover member even when driving oscillations of an internal combustion engine are transmitted to the cover member.

DESCRIPTION OF EMBODIMENTS

An embodiment of a valve timing control device serving as a variable valve device for an internal combustion engine according to the invention is hereinafter described in detail with reference to the drawings. In the shown embodiment, the variable valve device is applied to an intake-valve side valve timing control device. Alternatively, the variable valve device may be applied to an exhaust-valve side valve timing control device.

Figure 1:
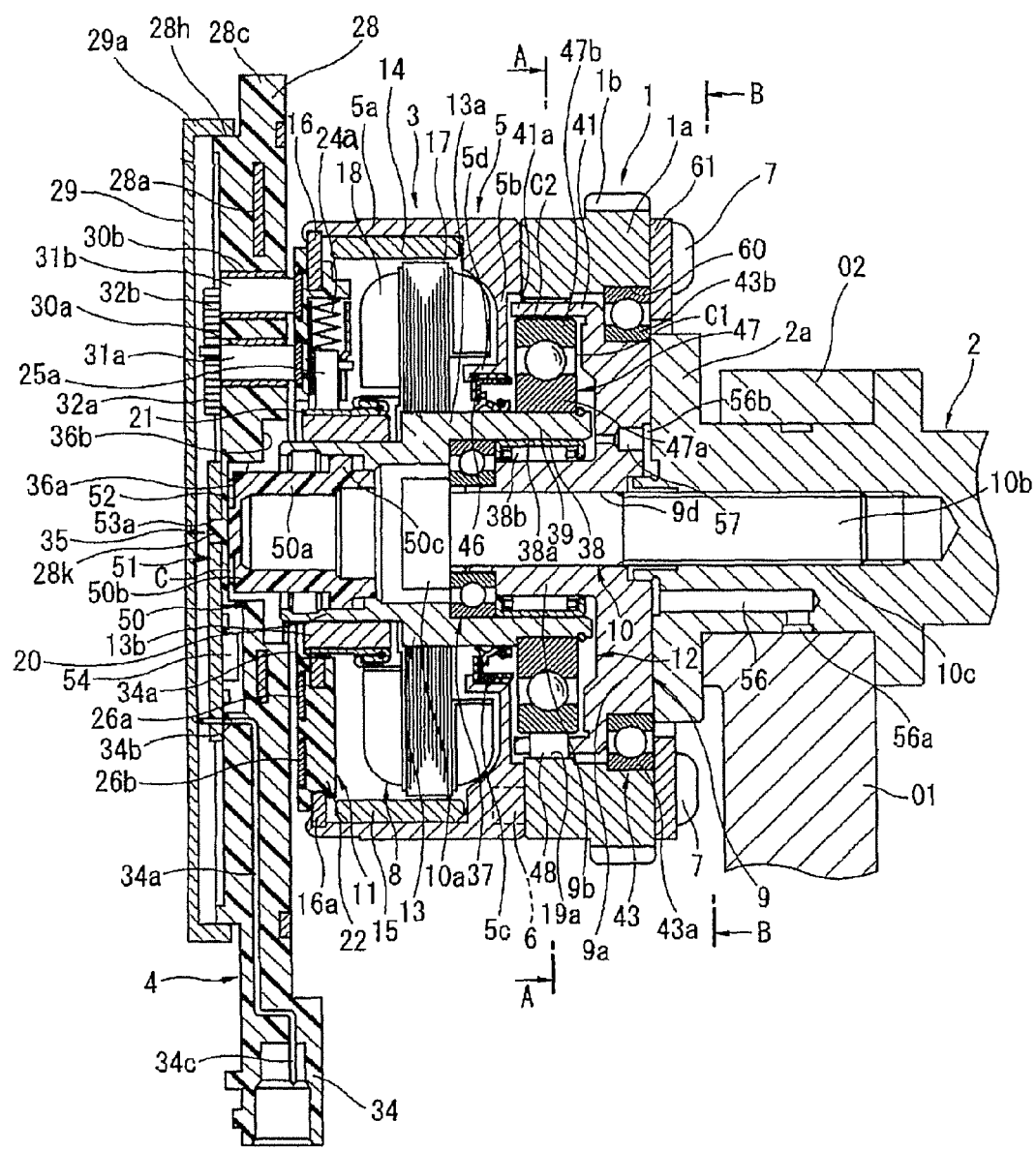
FIG. 1 is a longitudinal cross-sectional view illustrating an embodiment of a valve timing control device according to the invention, and also illustrating, on the left-hand side, a cover member corresponding to a cross-sectional view sectioned along the line C-C of FIG. 7.
Figure 2:
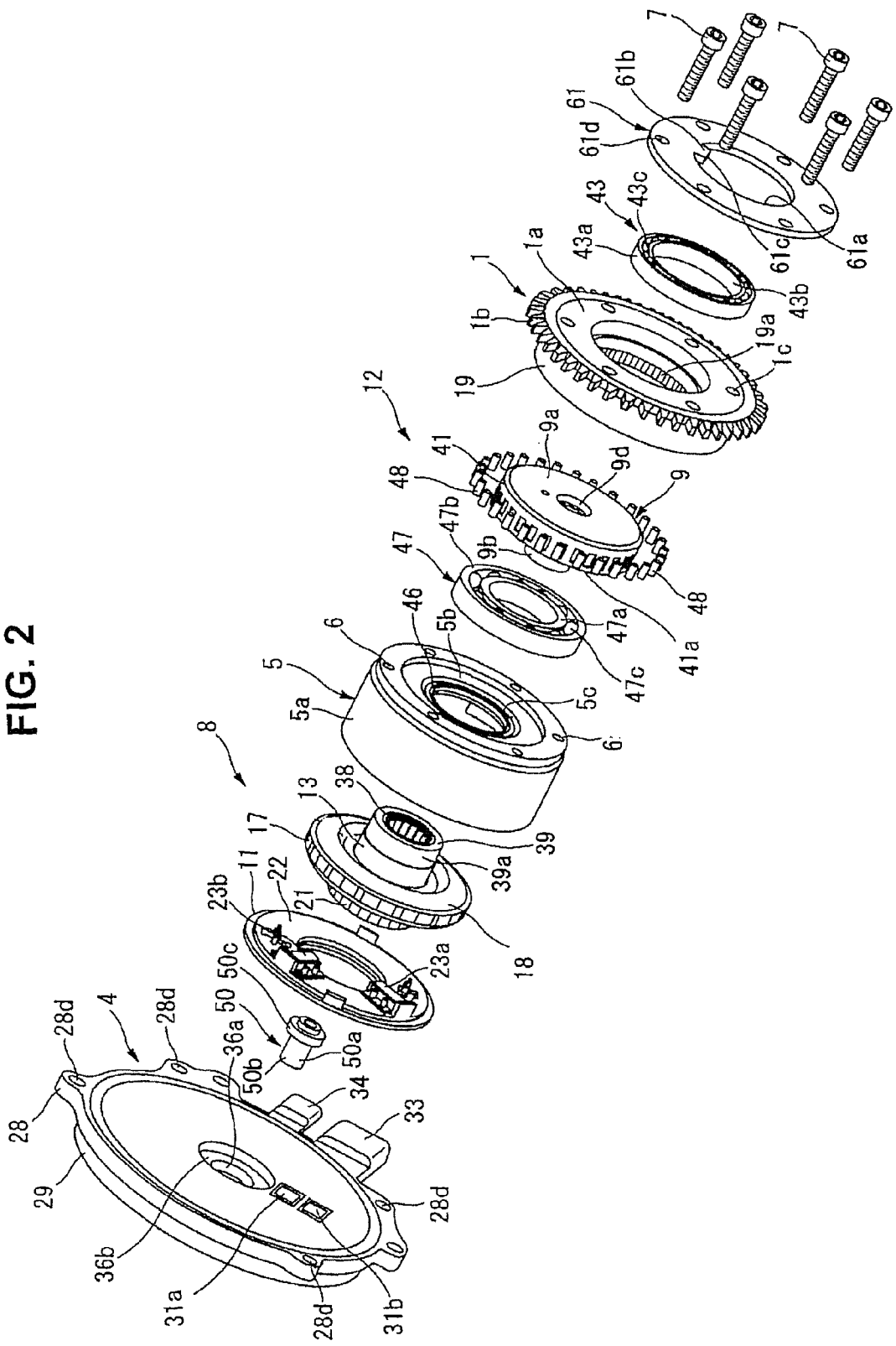
FIG. 2 is a disassembled perspective view illustrating the essential component parts of the embodiment.

As shown in FIGS. 1-2, the valve timing control device of the embodiment is equipped with a timing sprocket 1 serving as a first member rotationally driven by a crankshaft of the internal combustion engine, a camshaft 2 rotatably supported on a cylinder head 01 via a journal bearing 02 and rotated by a rotational force transmitted from the timing sprocket 1, a phase conversion mechanism 3 interposed between the timing sprocket 1 and the camshaft 2 for converting or changing a relative rotational phase of the camshaft 2 to the timing sprocket 1 depending on an engine operating condition, and a cover member 4 arranged at the front end side of phase conversion mechanism 3.

Timing sprocket 1 is integrally formed into a substantially annular shape and made from iron-based metal material. The timing sprocket is comprised of a sprocket body 1a formed with a stepped inner peripheral portion, a gear 1b formed integral with the outer periphery of sprocket body 1a and configured to receive a rotational force from the crankshaft through a wrapped timing chain (not shown), and an internal-tooth structural portion 19 integrally formed on the front end side of sprocket body 1a.

Also, timing sprocket 1 is rotatably supported by a large-diameter ball bearing 43 interleaved between the sprocket body 1a and a driven member 9 corresponding to a second member (described later) fixedly connected to the front end section of camshaft 2, so as to permit rotary motion of camshaft 2 relative to timing sprocket 1.

Large-diameter ball bearing 43 is a general ball bearing comprised of an outer ring 43a, an inner ring 43b, and balls 43c confined between outer and inner rings 43a-43b. The outer ring 43a is fixed to the inner periphery of sprocket body 1a, whereas the inner ring 43b is press-fitted and fixed to the outer periphery of driven member 9.

Sprocket body 1a has an annularly-grooved outer-ring retaining portion 60 formed and cut in its inner peripheral surface and configured to open toward the camshaft 2.

Outer-ring retaining portion 60 is formed as a shouldered annular groove into which the outer ring 43a of large-diameter ball bearing 43 is axially press-fitted. The shouldered portion of outer-ring retaining portion 60 serves to position one axial end face of the outer ring 43a in place.

Internal-tooth structural portion 19 is formed integral with the outer peripheral side of the front end section of sprocket body 1a, and formed into a cylindrical shape forwardly extending toward the phase conversion mechanism 3. The internal-tooth structural portion is formed on its inner periphery with a plurality of waveform internal teeth 19a.

Figure 4:
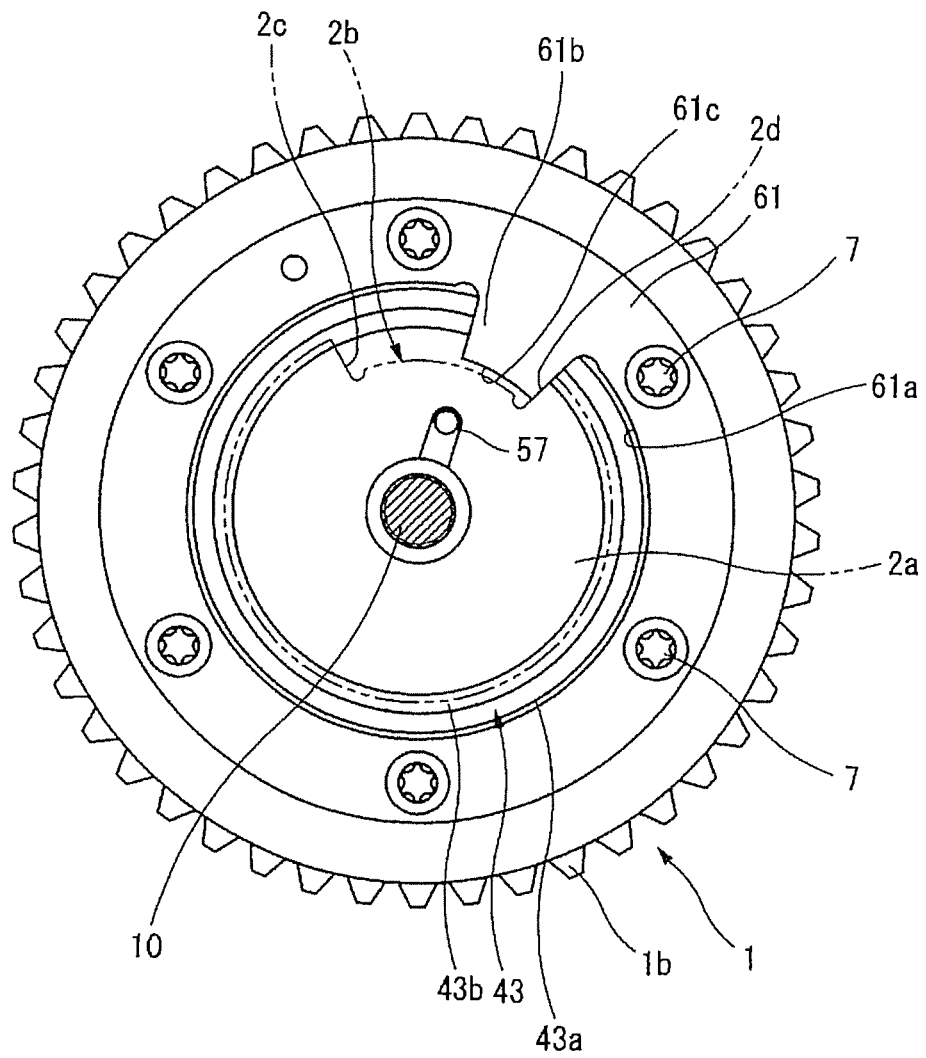
FIG. 4 is a cross-sectional view taken along the line B-B of FIG. 1.

Furthermore, an annular retainer plate 61 is located at the rear end of sprocket body 1a, facing apart from the internal-tooth structural portion 19. Retainer plate 61 is made from a metal plate. As shown in FIGS. 1 and 4, the outside diameter of retainer plate 61 is dimensioned to be approximately equal to that of the sprocket body 1a. The inside diameter of retainer plate 61 is dimensioned to be less than that of the outer ring 43a of large-diameter ball bearing 43.

The inner peripheral portion 61a of retainer plate 61 is kept in abutted-engagement with the outside end face of the outer ring. Also, the inner peripheral portion 61a of the annular retainer plate has a radially-inward protruding stopper 61b integrally formed at a given circumferential angular position of the inner peripheral portion 61a, and configured to protrude toward the central axis of the retainer plate.

The protruding stopper 61b is formed into a substantially sector. The innermost edge 61c of stopper 61b is configured to be substantially conformable to a shape of the circular-arc peripheral surface of a stopper groove 2b (described later). Additionally, the outer peripheral portion of retainer plate 61 is formed with circumferentially equidistant-spaced, six bolt insertion holes 61d (through holes) through which bolts 7 are inserted.

In a similar manner to the six bolt insertion holes 61d (through holes) formed in the retainer plate 61, the outer peripheral portion of sprocket body 1a (internal-tooth structural portion 19) is formed with circumferentially equidistant-spaced, six bolt insertion holes 1c (through holes). By the way, the sprocket body 1a and the internal-tooth structural portion 19 are structured as a casing for a speed reducer 12 (described later).

Also, the respective outside diameters of sprocket body 1a, internal-tooth structural portion 19, retainer plate 61, and a housing main body 5a (described later) are set or dimensioned to be approximately equal to each other.

As shown in FIG. 1, a motor housing 5 of an electric motor 8 is comprised of the housing main body 5a made from iron-based metal material and formed into a substantially cylindrical shape with a bottom face by pressing, and an electricity-feeding plate 11 provided for sealing the axially forward opening of housing main body 5a.

Housing main body 5a has a disk-shaped partition wall 5b formed at its rear end. Housing main body 5a has is also formed at a substantially center of the partition wall 5b with a large-diameter eccentric-shaft insertion hole 5c into which an eccentric shaft 39 (described later) is inserted. An axially extending cylindrical portion 5d is formed integral with the annular edge of eccentric-shaft insertion hole 5c in a manner so as to protrude in the axial direction of camshaft 2. Also, female screw-threaded holes 6 are axially formed in the outer periphery of the partition wall 5b. The internal-tooth structural portion 19 is kept axially in abutted-engagement with the rear end face of partition wall 5b of housing main body 5a.

Also, the female screw-threaded holes 6 are formed or configured to be conformable to respective circumferential positions of bolt insertion holes 1c (bolt insertion holes 61d). Hence, the timing sprocket 1, the retainer plate 61, and the motor housing 5 are integrally connected to each other by axially fastening them together with six bolts 7 inserted.

Camshaft 2 has two drive cams integrally formed on its outer periphery for operating the associated two intake valves (not shown) per one engine cylinder. Also, camshaft 2 has a flanged portion 2a integrally formed at its front end section.

As shown in FIG. 1, the outside diameter of flanged portion 2a is dimensioned to be slightly greater than that of the fixed-end portion 9a of the driven member 9 (described later). Hence, after installation of all component parts, the circumference of the front end face of the flanged portion is brought into abutted-engagement with the axially outside end face of the inner ring 43b of large-diameter ball bearing 43. Under a state where the front end face of flanged portion 2a has been brought into axially abutted-engagement with the driven member 9, the driven member and the camshaft flanged portion are axially connected to each other by means of a cam bolt 10.

As shown in FIG. 4, the outer periphery of flanged portion 2a is partially cut or formed as the stopper groove 2b recessed along the circumferential direction. The stopper recessed groove 2b is brought into engagement with the protruding stopper 61b of retainer plate 61. The stopper recessed groove 2b is formed into a circular-arc shape having a specified circumferential length to permit a circumferential movement of the protruding stopper 61b within a limited motion range determined based on the specified circumferential length. Hence, a maximum phase-advance position of camshaft 2 relative to timing sprocket 1 is restricted by abutment between the counterclockwise edge of protruding stopper 61b and the clockwise edge 2c of stopper groove 2b. On the other hand, a maximum phase-retard position of camshaft 2 relative to timing sprocket 1 is restricted by abutment between the clockwise edge of protruding stopper 61b and the counterclockwise edge 2d of stopper groove 2b.

By the way, the previously-noted protruding stopper 61b is somewhat displaced toward the side of camshaft 2 with respect to the inner peripheral retaining portion of retainer plate 61, which retaining portion is configured to axially face and retain the outer ring. Thus, the protruding stopper is kept in a spaced, contact-free relationship with the fixed-end portion 9a of driven member 9 in the axial direction, thereby suppressing undesirable interference between the protruding stopper 61b and the fixed-end portion 9a.

As shown in FIG. 1, cam bolt 10 is comprised of a head 10a and a shank 10b. The axial end face of the head 10a is configured to support the inner ring of a small-diameter ball bearing 37 in the axial direction. Also, the cam bolt is formed on the outer periphery of shank 10b with a male screw-threaded portion 10c, which is screwed into a female screw-threaded portion machined into the axial end of camshaft 2 along the axial direction.

Driven member 9 is made from iron-based metal material. As shown in FIG. 1, the driven member 9 is comprised of the disk-shaped fixed-end portion 9a formed on the rear end side (on the side of camshaft 2), an axially-forward-extending cylindrical portion 9b formed integral with the front end face of fixed-end portion 9a, and a cylindrical cage 41, which cage is formed integral with the outer periphery of fixed-end portion 9a and configured to hold a plurality of rollers 48.

The rear end face of fixed-end portion 9a is arranged to abut with the front end face of the flanged portion 2a of camshaft 2, and fixedly connected to and kept in press-contact with the flanged portion 2a by an axial force of cam bolt 10.

As shown in FIG. 1, the previously-noted cylindrical portion 9b is formed with a central bore 9d into which the shank 10b of cam bolt 10 is inserted. A needle bearing 38 is mounted on the outer periphery of cylindrical portion 9b.

As shown in FIG. 1, cage 41 is configured to further extend from the front end of the outer periphery of fixed-end portion 9a, and bent into a substantially L shape in cross section and formed into a bottomed cylindrical shape extending in the same axial direction as the cylindrical portion 9b.

The cylindrical end portion 41a of cage 41 is configured to extend toward the partition wall 5b of motor housing 5 through an annular recessed internal accommodation space defined between the internal-tooth structural portion 19 and the partition wall 5b. Also, as shown in FIGS. 1-2, the cylindrical end portion 41a has a plurality of substantially rectangular roller-holding holes 41b, which are configured to be equidistant-spaced from each other with a given circumferential interval in the circumferential direction of the cylindrical end portion. The plurality of rollers 48 are rotatably held or retained in the respective roller-holding holes. Each individual roller-holding hole 41b is configured to have a closed end and formed into an elongated shape in the fore-and-aft direction. The roller-retaining holes 41b (rollers 48) are configured such that the number of the roller-holding holes is fewer than the number of the internal teeth 19a of internal-tooth structural portion 19, thereby achieving a prescribed reduction gear ratio.

Phase conversion mechanism 3 is mainly constructed by the electric motor 8 located at the front end side of driven member 9, and the speed reducer 12 provided for reducing the rotational speed of electric motor 8 and for transmitting the reduced motor speed to the camshaft 2.

As shown in FIGS. 1-2, electric motor 8 is a brush-equipped direct-current (DC) motor. Electric motor 8 is comprised of the motor housing 5 serving as a yoke that rotates together with the timing sprocket 1, the motor output shaft 13 rotatably installed in the motor housing 5, a pair of semi-circular permanent magnets 14, 15 serving as a stator fixed onto the inner peripheral surface of motor housing 5, and the electricity-feeding plate 11 fixed to the front end section of motor housing 5.

Motor output shaft 13 is formed into a shouldered cylindrical-hollow shape, and serves as an armature. Motor output shaft 13 is constructed by a large-diameter portion 13a on the side of camshaft 2 and a small-diameter portion 13b on the side of cover member 4 through a shouldered portion formed substantially at a midpoint of the axially-extending cylindrical-hollow motor output shaft. An iron-core rotor 17 is fixedly connected onto the outer periphery of large-diameter portion 13a. Also, large-diameter portion 13a is formed at its rear end integral with the eccentric shaft 39.

On the other hand, regarding small-diameter portion 13b, an annular member 20 is press-fitted onto the outer periphery of the small-diameter portion. A commutator 21 (describer later) is axially press-fitted onto the outer peripheral surface of annular member 20. The outside diameter of annular member 20 is dimensioned to be approximately equal to that of large-diameter portion 13a. Also, annular member 20 is disposed or located substantially at a middle position of small-diameter portion 13b.

Iron-core rotor 17 is formed by a magnetic material having a plurality of magnetic poles. The outer periphery of iron-core rotor 17 is constructed as a bobbin having slots on which the winding of each of coils 18 is wound. The inner peripheral portion of iron-core rotor 17 is fixed onto the outer periphery of the shouldered portion of motor output shaft 13, while being axially positioned in place by the shouldered portion.

Commutator 21 is formed as a substantially annular shape and made from a conductive material. Commutator 21 is divided into a plurality of segments whose number is equal to the number of magnetic poles of iron-core rotor 17. Terminals of the coil winding drawn out from coil 18 are electrically connected to each of these segments of the commutator.

As a whole, the previously-discussed permanent magnets 14, 15 are formed into a cylindrical shape, and have a plurality of magnetic poles in the circumferential direction. The axial position of each of permanent magnets 14, 15 is offset from the axial center of iron-core rotor 17 toward the electricity-feeding plate 11. Hence, the front ends of permanent magnets 14, 15 are arranged to overlap with switching brushes 25a, 25b and the like (described later) installed on commutator 21 and electricity-feeding plate 11 in the radial direction.

Figure 5:
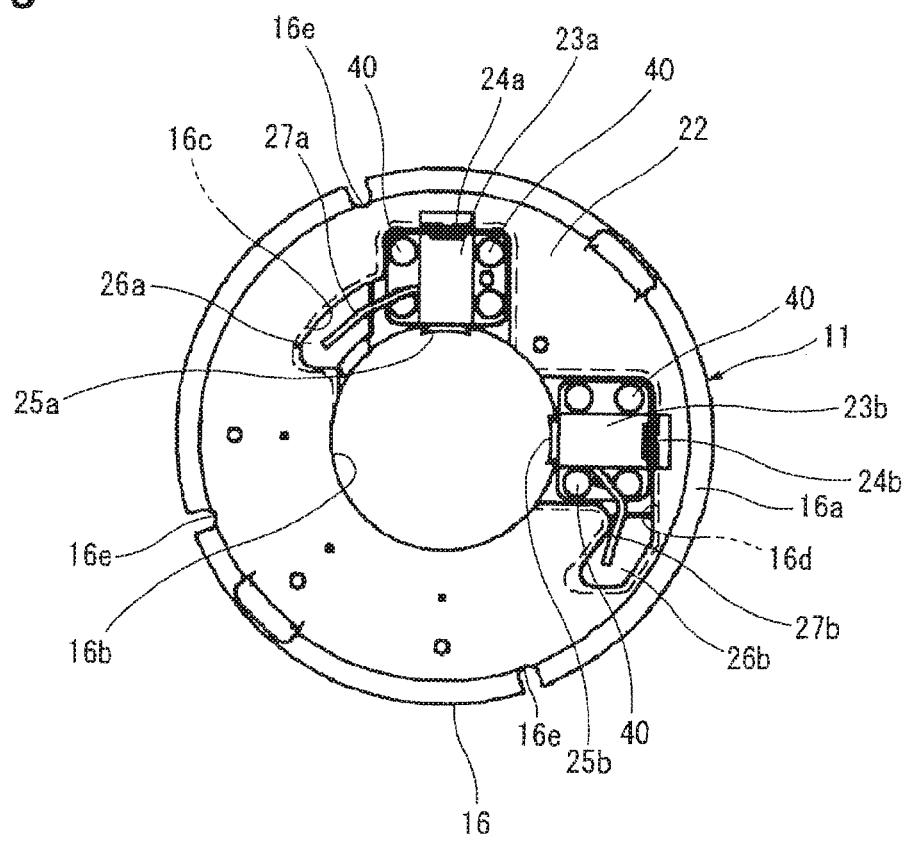
FIG. 5 is a back view of an electricity-feeding plate of the embodiment.

As shown in FIGS. 1 and 5, the previously-discussed electricity-feeding plate 11 is comprised of a disk-shaped metal rigid plate section 16 (simply, a rigid plate) made from iron-based metal material and a resin section 22 molded to both side faces of the rigid plate section 16 in the fore-and-aft direction. The electricity-feeding plate 11 constructs a part of an electricity-feeding mechanism for electricity-feeding to the electric motor 8.

As shown in FIGS. 1 and 5, an outer peripheral portion 16a (not surrounded by the resin section 22) of rigid plate 16 is positioned and fixed to an annular stepped recessed groove formed in the inner periphery of the front end section of motor housing 5 by caulking. The rigid plate 16 is formed at its center with a shaft insertion hole 16b, into which the small-diameter portion 13b of motor output shaft 13 is inserted. Also, the rigid plate 16 has two deformed retaining holes 16c, 16d formed by punching at respective predetermined positions being continuous with the inner peripheral edge of the shaft insertion hole 16b. Brush holders 23a, 23b (described later) are fitted and retained into respective retaining holes 16c, 16d.

By the way, three U-shaped grooves 16e are formed at respective predetermined circumferential positions of the outer peripheral portion 16a, for circumferentially positioning the rigid plate section with respect to the housing main body 5a through a jig (not shown).

As shown in FIGS. 1 and 5, the above-mentioned electricity-feeding plate 11 is equipped with a pair of copper brush holders 23a, 23b, a pair of switching brushes 25a, 25b, inner and outer double electricity-feeding slip rings 26a, 26b, and harnesses 27a, 27b. The copper brush holders are arranged inside of respective retaining holes 16c, 16d of rigid plate 16, and fixed to the front end section of resin section 22 by a plurality of rivets 40. The pair of switching brushes 25a, 25b are accommodated and held in respective brush holders 23a, 23b so as to be radially slidable. The circular-arc shaped top end faces of these switching brushes are kept in elastic-contact (sliding-contact) with the outer peripheral surface of commutator 21 by respective spring forces of coil springs 24a, 24b. The inner and outer double electricity-feeding slip rings 26a, 26b are attached to the front end side of resin section 22, such that the outside face of each of these electricity-feeding slip rings is partially exposed and that the inside of each of these electricity-feeding slip rings is buried or molded in the front end side of resin section 22. The harness 27a is provided to electrically connect the switching brush 25a to the slip ring 26a, while the harness 27b is provided to electrically connect the switching brush 25b to the slip ring 26b.

The inner peripheral side small-diameter slip ring 26a and the outer peripheral side large-diameter slip ring 26b are made from a thin copper plate and formed into an annular shape by punching.

Figure 6:
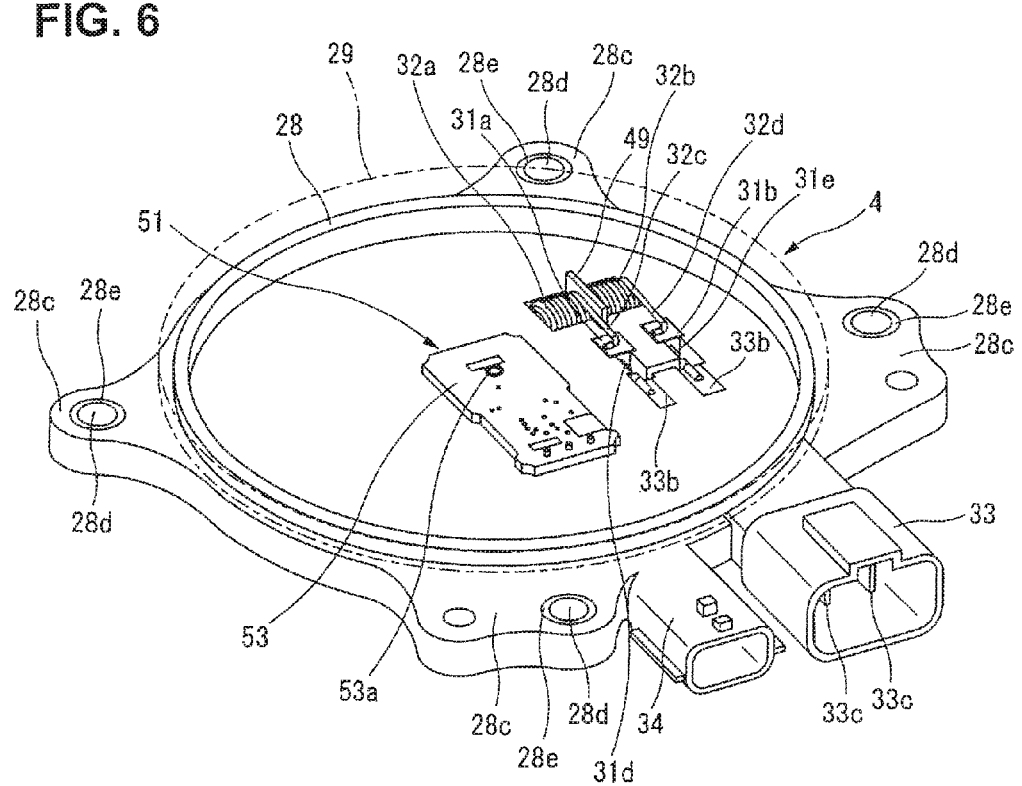
FIG. 6 is a perspective view of the cover member of the embodiment.

As shown in FIGS. 1 and 6, the previously-discussed cover member 4 is formed into a substantially disk shape, and arranged on the front end side of electricity-feeding plate 11 so as to cover the front end section of housing main body 5a. The cover member is comprised of a disk plate-like cover main body 28 and a cover portion 29 configured to cover the front end section of cover main body 28.

As shown in FIGS. 1, and 6-10, cover main body 28 is mainly made from a synthetic resin, and configured to have a predetermined thickness, and formed such that the outside diameter of the cover main body is greater than that of housing main body 5a. Also molded and fixed inside of the cover main body is a reinforcing plate 28a serving as a deformation suppression member, which is a metal core material having a less linear expansion coefficient and a higher elastic modulus (a higher Young's modulus) than a synthetic resin material. Also, cover main body 28 has circular-arc shaped boss sections 28c formed to protrude from four positions of its outer periphery. Bolt insertion holes 28d, into which bolts screwed and fixed to a chain case (not shown) are inserted, are formed or structured in the respective boss sections 28c by cylindrical metal sleeves 28e molded inside of the resin material.

Figure 7:
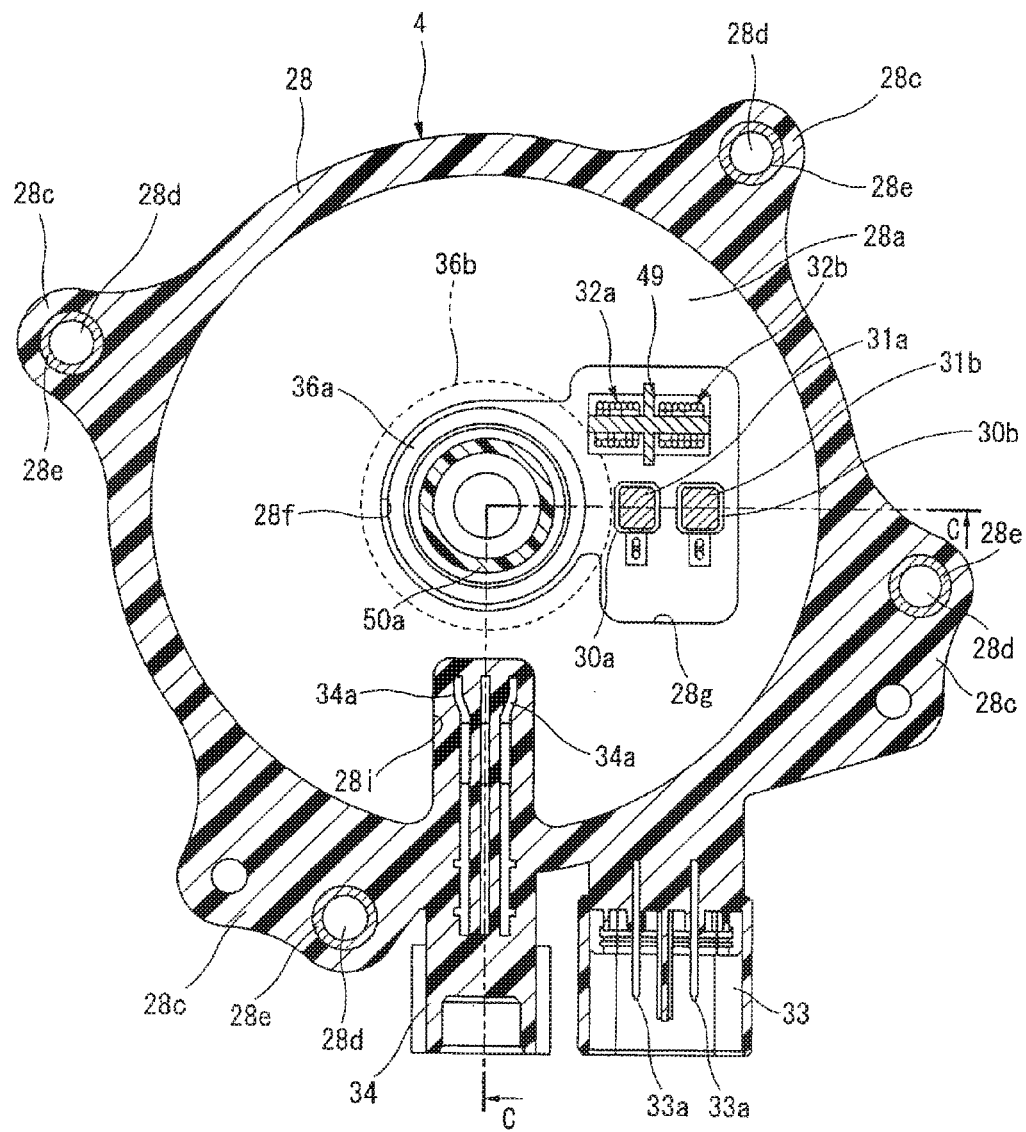
FIG. 7 is a cross-sectional view of the cover member.

As shown in FIG. 7, the above-mentioned reinforcing plate 28a is formed into a substantially disk shape having an outside diameter less than the outside diameter of cover main body 28. The reinforcing plate 28a is formed at its center position with a circular through hole 28f. A substantially rectangular window section 28g is formed through one side edge of the through hole 28f. Also formed along the radial direction in the lower section of FIG. 7 is an elongated rectangular cutout section 28i in which a conductive material of a signal connector 34 (described later) is disposed.

Through hole 28f is formed such that the inside diameter of the through hole is dimensioned to be greater than the inside diameter of a recessed groove 36a (described later) and less than the inside diameter of a large-diameter groove 36b (described later).

The above-mentioned window section 28g is configured to communicate with the one side of through hole 28f. Brush holders 30a, 30b are molded and fixed by the synthetic resin material charged or filled in the window section 28g. Also molded and fixed is a resin holder 49 having a substantially cruciform cross section and provided for holding torsion coil springs 32a, 32b.

Signal terminal strips 34a (described later) are buried in the synthetic resin material charged or filled in the cutout section 28i.

The above-mentioned cover portion 29 is formed into a disk plate shape, and has an annular engagement protruding section 29a formed integral with its outer peripheral edge. The annular engagement protruding section 29a is axially press-fitted and fixed to a shouldered engagement groove 28h formed the outer peripheral portion of cover main body 28.

The cover main body 28 has a pair of rectangular cylindrical brush holders 30a, 30b fixed at positions axially opposing to respective slip rings 26a, 26b and arranged along the axial direction. Electricity-feeding brushes 31a, 31b, whose top end faces are kept in sliding-contact with respective slip rings 26a, 26b, are axially slidably held in the insides (i.e., retaining holes) of respective brush holders 30a, 30b.

The circular recessed groove 36a, which constructs a part of a recessed section, is formed at a substantially center position of the inside face of cover main body 28, facing the side of electric motor 8. The recessed groove 36a is formed in the cover main body 28 so as to be recessed axially outward. The inside diameter of the recessed groove is dimensioned to be greater than the outside diameter of the top end section 50b of a detected unit 50 (described later). The recessed groove has a depth dimensioned to be slightly less than the axial width of cover main body 28, and has a thin-walled bottom wall. Also provided is a positioning protruding section 28k formed integral with the thin bottom wall at a substantially center position of the outside face of the thin bottom wall.

Figure 10:
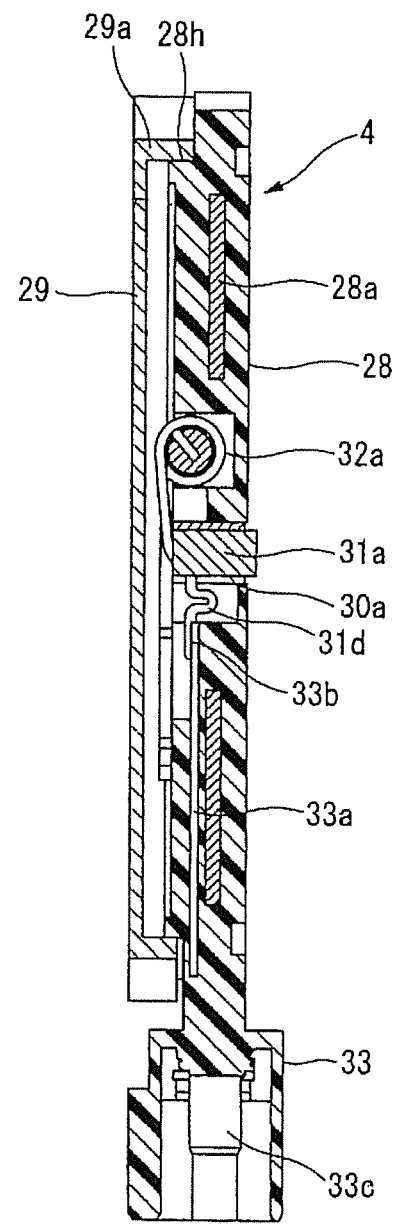
FIG. 10 is a cross-sectional view taken along the line E-E of FIG. 8.

The pair of torsion coil springs 32a, 32b are installed within the window section 28g through the resin holder 49, for biasing the electricity-feeding brushes 31a, 31b toward respective slip rings 26a, 26b. As shown in FIGS. 6 and 10, the coil sections of torsion coil springs 32a, 32b are accommodated and disposed within a recessed section defined on one side face of the cover portion 29. Radially-protruding spring ends 32c, 32d of the torsion coil springs are kept in elastic-contact with rear end faces of electricity-feeding brushes 31a, 31b, such that these electricity-feeding brushes are pushed toward respective slip rings 26a, 26b.

Front and rear ends of each of brush holders 30a, 30b are formed as opening ends, such that the top ends of electricity-feeding brushes 31a, 31b freely move back and forth through the respective front opening ends. Harness ends of pigtail harnesses 31d, 31e are connected through the respective rear end openings to rear ends of electricity-feeding brushes 31a, 31b.

The lengths of pigtail harnesses 31d, 31e are set such that electricity-feeding brushes 31a, 31b do not fall out of the brush holders 30a, 30b even when the electricity-feeding brushes are pushed forward by respective spring forces of torsion coil springs 32a, 32b.

Each of electricity-feeding brushes 31a, 31b is formed into a prismatic shape, and set to a predetermined axial length. Furthermore, electricity-feeding brushes 31a, 31b are arranged such that their flat top end faces axially abut against respective slip rings 26a, 26b.

Also, a power supply connector 33 is formed integral with the lower end section of cover main body 28, for electric-current supply from a control unit (not shown) to the electricity-feeding brushes 31a, 31b. The signal connector 34, which outputs a rotational angle signal detected by a detecting unit 51 to the control unit, is juxtaposed to the power supply connector 33 in a manner so as to protrude radially.

As shown in FIGS. 6 and 10, power-supply connector 33 is configured such that respective ends 33b, 33b of terminal strips 33a, 33a (serving as conductive materials partly buried in the cover main body 28) are connected to the pigtail harnesses 31d, 31e. On the other hand, the other ends 33c, 33c, which are exposed outside, are connected to a female connector terminal (not shown) on the control unit side.

Figure 9:
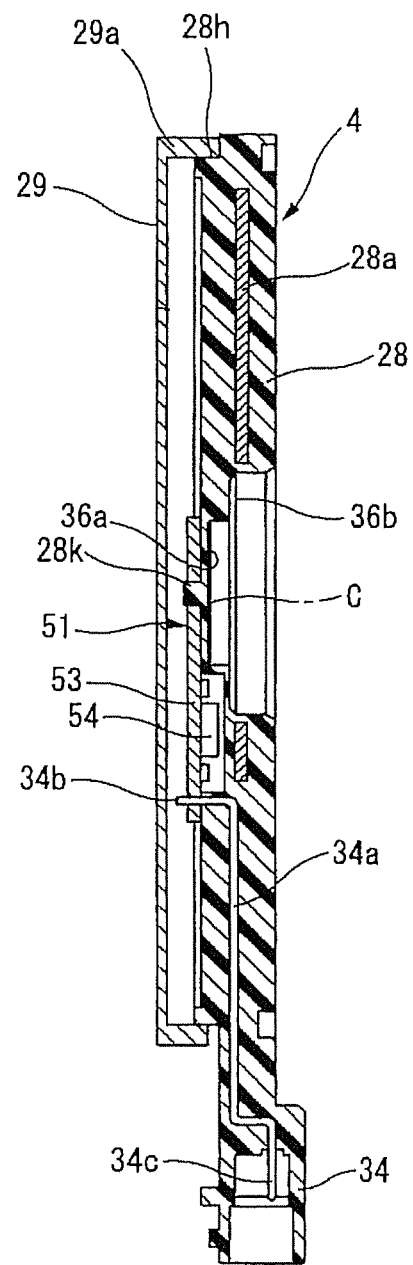
FIG. 9 is a cross-sectional view taken along the line D-D of FIG. 8.

As shown in FIGS. 1 and 9, signal connector 34 is configured such that each one end 34b of the plurality of terminal strips 34a (serving as conductive materials partly buried in the cover main body 28) is connected to an integrated circuit 54 of a printed wiring board 53. On the other hand, the other ends 34c which are exposed outside, are connected to the female connector terminal (not shown) on the control unit side.

Also provided at the center section sandwiched between the small-diameter portion 13b of motor output shaft 13 and the bottom wall of the recessed groove 36a of cover main body 28 is an angle sensor 35 serving as a rotational angle detection mechanism for detecting a rotational angle position of motor output shaft 13.

The angle sensor 35 is an electromagnetic induction type. As shown in FIGS. 1, 11, and 12, the angle sensor is comprised of the detected unit 50 fixed into the small-diameter portion 13b of motor output shaft 13 and the detecting unit 51 fixed at the substantially center position of cover main body 28 and provided for receiving a detection signal from the detected unit 50.

Figure 11A:
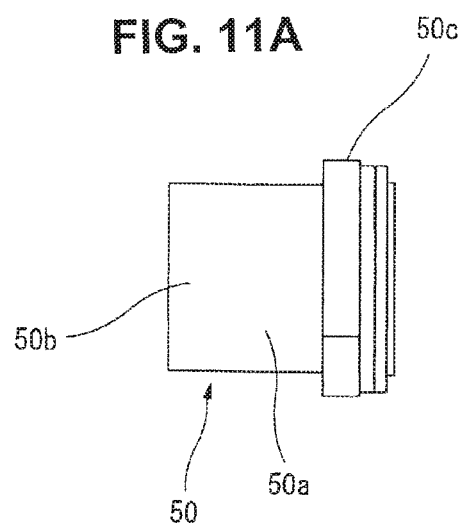
FIG. 11 illustrates a detected unit of the embodiment, and assuming FIG. 11A to be a front view of the detected unit.
FIG. 11B is a left-hand side view of the detected unit and FIG. 11C is a right-hand side view of the detected unit.
Figure 11B:
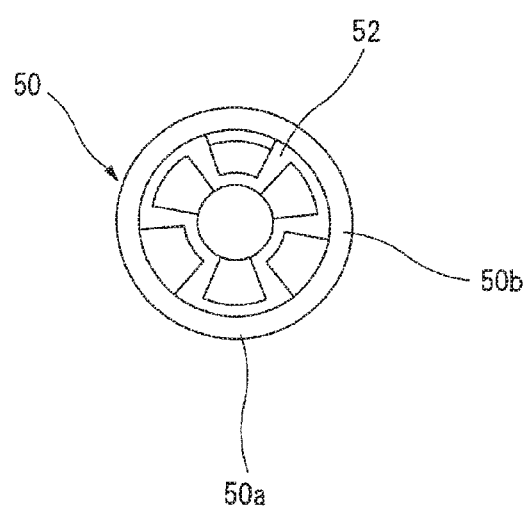
Figure 11C:
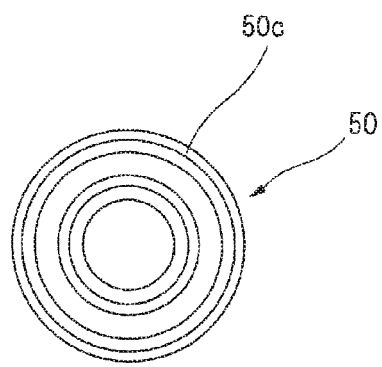

As shown in FIGS. 11A-11C, the detected unit 50 is configured such that a trefoil thin-plate detected rotor 52 is fixed to the bottom wall surface of the axial top end section 50b of a substantially cylindrical bottomed support section 50a made from a synthetic resin material. Additionally, an annular protrusion 50c, which is press-fitted into the small-diameter portion 13b of motor output shaft 13, is formed integral with the outer periphery of the rear end section of the support section 50a.

Also, the outside diameter of the support section 50a is dimensioned to be less than the inside diameter of the recessed groove 36a. The top end section 50b, which protrudes from the top end of the small-diameter portion 13b of motor output shaft 13, is arranged to be inserted into the recessed groove 36a of cover main body 28. The detected rotor 52 is arranged to face the bottom face of the thin bottom wall of the recessed groove 36a through a minute clearance C.

Figure 12A:
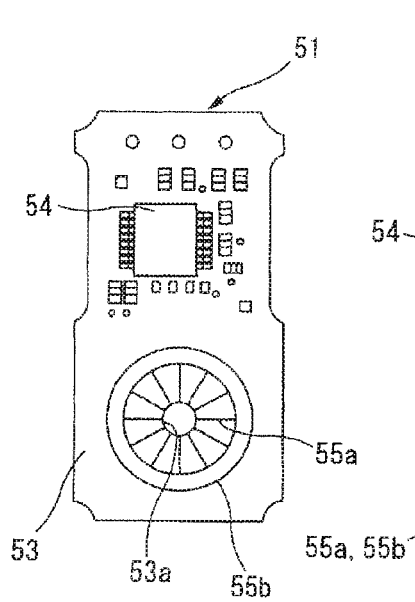
FIG. 12 shows a detecting unit of the embodiment, and assuming FIG. 12A to be a front view of the detecting unit.
FIG. 12B is a right-hand side view of the detecting unit and FIG. 12C is a back view of the detecting unit.
Figure 12B:
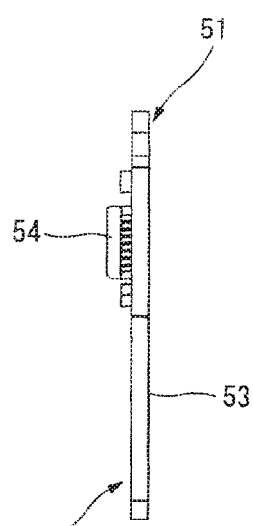
Figure 12C:
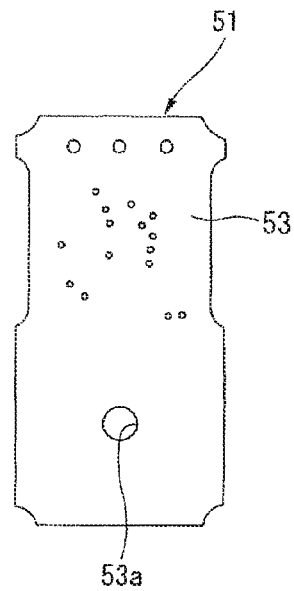

As shown in FIGS. 12A-12C, the detecting unit 51 is equipped with the substantially rectangular printed wiring board 53 extending radially from the substantially center position of cover main body 28, the integrated circuit (application specific integrated circuit, abbreviated to "ASIC") 54 arranged on the outside surface of one end of printed wiring board 53 in the longitudinal direction, and a receiving circuit 55a and an oscillating circuit 55b both located at the other end of the printed wiring board and arranged on the same outside surface as the integrated circuit 54.

The above-mentioned printed wiring board 53 is formed at the center of the receiving circuit 55a and oscillating circuit 55b with a positioning small hole 53a. The positioning small hole 53a is press-fitted to the positioning protruding section 28k, for positioning of the center of the detected rotor 52 and the center of the receiving circuit 55a and oscillating circuit 55b.

Also, the printed wiring board 53 is fixed onto the front end face of cover main body 28 by fixing/joining means, such as screws, soldering or the like. Therefore, the receiving circuit 55a and oscillating circuit 55b is arranged to be axially opposed to the bottom wall of the recessed groove 36a through the minute clearance C in the axial direction of the detected rotor 52.

Hence, by rotating the detected rotor 52 through the support section 50a in accordance with rotation of motor output shaft 13, an induced current flows between the receiving circuit 55a and oscillating circuit 55b and the detected rotor 52, and thus the integrated circuit 54 detects a rotational angle of motor output shaft 13, utilizing the electromagnetic inductive action, and then outputs the detected signal to the control unit.

Figure 8:
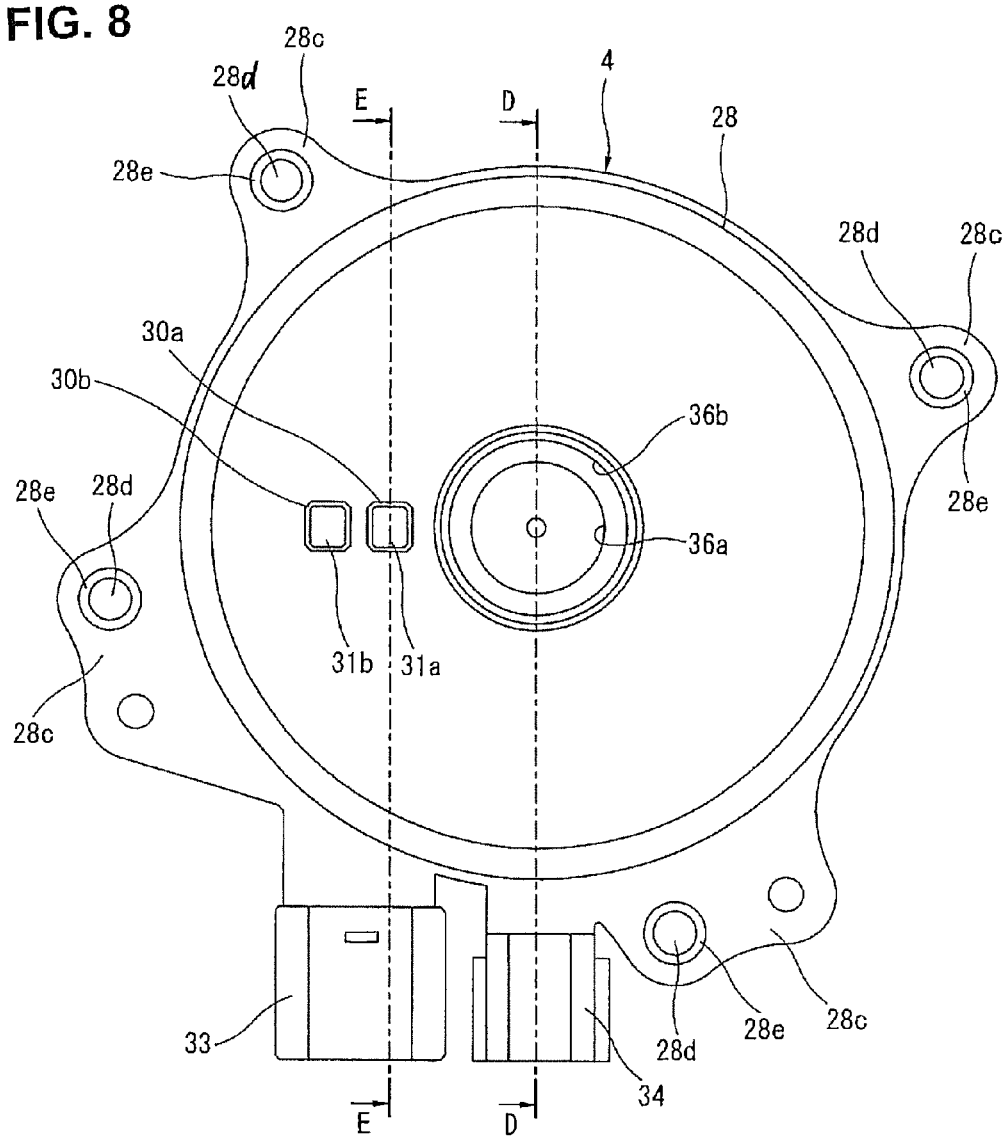
FIG. 8 is a front view of the cover member.

The large-diameter groove 36b is formed on the outer peripheral side of the opening of the recessed groove 36a of cover main body 28. The large-diameter groove 36b has the inside diameter greater than the inside diameter of the recessed groove 36a, and constructs the remainder of the recessed section. As shown in FIGS. 1, and 8-9, the large-diameter groove 36b is formed such that its inside diameter is dimensioned to be approximately equal to the outside diameter of annular member 20 and that its depth is a depth from the rear end face of the center section of cover main body 28 to a substantially middle position (i.e., to the opening end of recessed groove 36a) of the cover main body in the axial direction. The large-diameter groove 36b and the recessed groove 36a are offset outside from the abutting position between the slip rings 26a, 26b and the top ends of electricity-feeding brushes 31a, 31b. The large-diameter groove 36b and the recessed groove 36a cooperate with each other to provide or construct a labyrinth groove.

The motor output shaft 13 and the eccentric shaft 39 are rotatably supported by means of the small-diameter ball bearing 37 and the needle bearing 38. The small-diameter ball bearing is installed on the outer peripheral surface of shank 10b of cam bolt 10. The needle bearing is installed on the outer peripheral surface of cylindrical portion 9b of driven member 9 and axially arranged in juxtaposition with the small-diameter ball bearing 37.

Needle bearing 38 is comprised of a cylindrical retainer 38a press-fitted into the inner peripheral surface of eccentric shaft 39 and a plurality of needle rollers 38b (rolling elements) rotatably retained inside of the retainer 38a. Each of needle rollers 38b is in rolling-contact with the outer peripheral surface of cylindrical portion 9b of driven member 9.

Regarding the small-diameter ball bearing 37, its inner ring is fixed in a manner so as to be sandwiched between the front end edge of cylindrical portion 9b of driven member 9 and the head 10a of cam bolt 10. On the other hand, its outer ring is press-fitted to the stepped diameter-enlarged inner peripheral surface of eccentric shaft 39, and thus axial positioning of the outer ring is made by abutment with the stepped edge of the diameter-enlarged inner peripheral surface.

A small-diameter oil seal 46 is interleaved between the outer peripheral surface of motor output shaft 13 (eccentric shaft 39) and the inner peripheral surface of the axially extending cylindrical portion 5d of motor housing 5, for preventing leakage of lubricating oil from the inside of speed reducer 12 toward the inside of electric motor 8. Small-diameter oil seal 46 serves as a partition having a sealing function between electric motor 8 and speed reducer 12.

The previously-discussed control unit is configured to detect the current engine operating condition based on input informational signals from various sensors (not shown), namely, a crank angle sensor, an airflow meter, a water temperature sensor, an accelerator opening sensor, and the like, for executing engine control based on the current engine operating condition. Also, the control unit is configured to electricity-feed to each of coils 18 via the electricity-feeding brushes 31a, 31b, slip rings 26a, 26b, switching brushes 25a, 25b, and commutator 21 for carrying out rotation control of motor output shaft 13, thus controlling a relative rotational phase of camshaft 2 to timing sprocket 1 through the use of the speed reducer 12.

Figure 3:
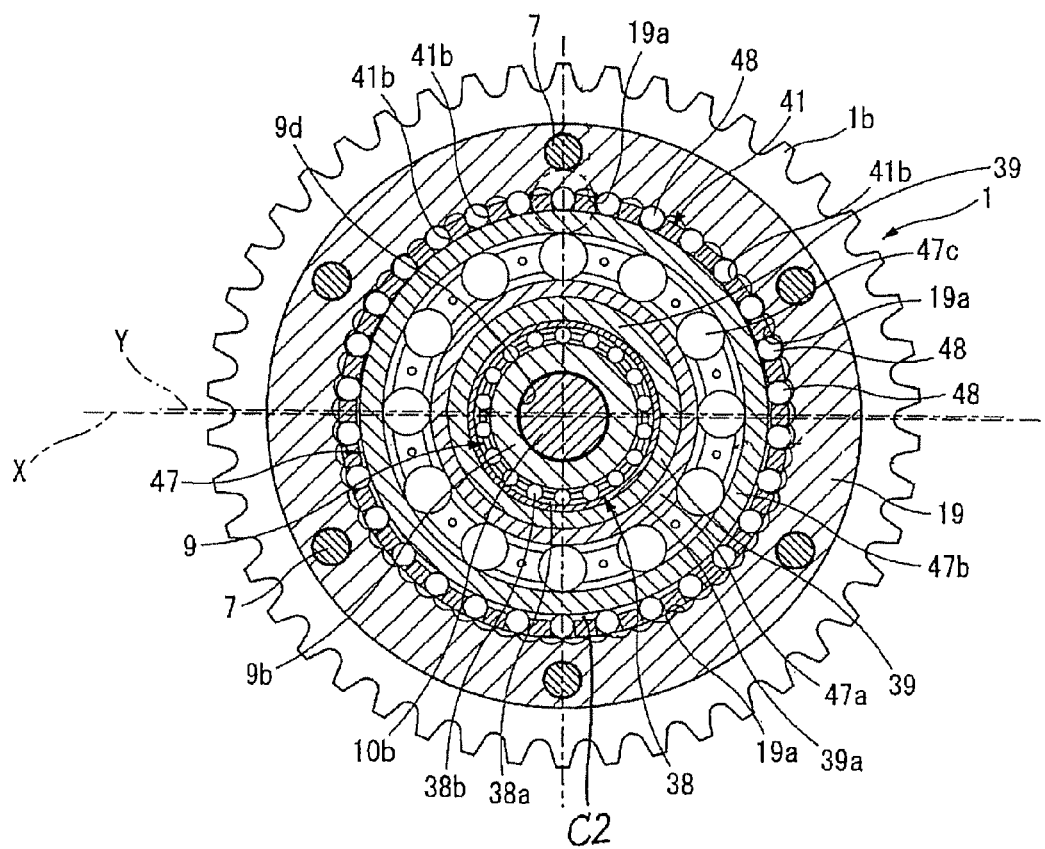
FIG. 3 is a cross-sectional view taken along the line A-A of FIG. 1.

As shown in FIGS. 1-3, speed reducer 12 is mainly comprised of the eccentric shaft 39 that performs eccentric rotary motion, a middle-diameter ball bearing 47 installed on the outer periphery of eccentric shaft 39, rollers 48 installed on the outer periphery of middle-diameter ball bearing 47, cage 41 configured to retain and guide these rollers 48 in the direction of rolling movement of these rollers, while permitting a radial displacement (an oscillating motion) of each of rollers 48, and the driven member 9 formed integral with the cage 41.

As shown in FIG. 3, the geometric center "Y" of the cam contour surface 39a, formed on the outer periphery of the eccentric shaft, is slightly displaced from the axis "X" of motor output shaft 13 in the radial direction.

Most of middle-diameter ball bearing 47 is arranged to radially overlap with the needle bearing 38. Middle-diameter ball bearing 47 is comprised of an inner ring 47a, an outer ring 47b, and balls 47c rotatably disposed and confined between inner and outer rings 47a, 47b. The inner ring 47a is press-fitted onto the outer peripheral surface (the eccentric-cam contour surface) of eccentric shaft 39. In contrast to the inner ring, the outer ring 47b is not securely fixed in the axial direction, such that the outer ring is free and therefore is able to move contact-free. That is, one sidewall surface of the outer ring 47b, axially facing the side of electric motor 8, is kept out of contact with any part of the motor housing, while the other sidewall surface of the outer ring, axially opposed to the inside wall surface of cage 41, is kept in spaced, contact-free relationship with the inside wall surface of the cage with a minute first clearance C1. Also, rollers 48 are held in rolling-contact with the outer peripheral surface of outer ring 47b. Additionally, a crescent-shaped annular second clearance C2 is defined on the outer peripheral side of outer ring 47b. Owing to eccentric rotary motion of eccentric shaft 39, middle-diameter ball bearing 47 can be radially displaced by virtue of the annular second clearance C2, thus ensuring eccentric displacement of the middle-diameter ball bearing.

Each of rollers 48 is made from iron-based metal material. Owing to the eccentric displacement of middle-diameter ball bearing 47, some of rollers 48 are brought into fitted-engagement into some troughs of internal teeth 19a of internal-tooth structural portion 19, while radially moving. That is, owing to the eccentric displacement, each of rollers 48 can radially oscillate, while being circumferentially guided by both inside edges of each of roller-holding holes 41b of cage 41.

Also provided is a lubricating-oil supply means for supplying lubricating oil into the internal space of speed reducer 12. The lubricating-oil supply means is comprised of an oil supply passage which is formed in the journal bearing 02 of the cylinder head 01 and to which lubricating oil is supplied from a main oil gallery (not shown), an oil supply hole 56 formed in the camshaft 2 so as to extend axially and configured to communicate the oil supply passage via an oil groove 56a, a small-diameter oil hole 57, and an oil drain hole (not shown) formed through the driven member 9. Small-diameter oil hole 57 is formed as an axially-extending through hole in the driven member 9, such that one end of the small-diameter oil hole is opened into the oil supply hole 56 through an annular groove 56b and the other end of the small-diameter oil hole is opened into the internal space defined near both the needle bearing 38 and the middle-diameter ball bearing 47.

By the previously-discussed lubricating-oil supply means, lubricating oil can be supplied into and retained in the internal space of the speed reducer. Then, the lubricating oil is supplied from the internal space to moving parts, namely, middle-diameter ball bearing 47 and rollers 48 for lubrication, and further flows into the eccentric shaft 39 and the internal space of motor output shaft 13, for lubrication of moving parts, such as needle bearing 38 and small-diameter ball bearing 37.

[Operation of Embodiment]

The operation of the valve timing control device of the embodiment is hereunder described in detail. When the engine crankshaft is driven, timing sprocket 1 rotates in synchronism with rotation of the crankshaft through the timing chain. A rotational force (torque) is transmitted from the timing sprocket through the internal-tooth structural portion 19 to the motor housing 5, and thus the motor housing 5 rotates synchronously. On the other hand, a rotational force (torque) of internal-tooth structural portion 19 is transmitted via the rollers 48, cage 41, and driven member 9 to the camshaft 2, thereby enabling the cams of camshaft 2 to operate (open/close) the intake valves.

During a given engine operating condition after the engine start-up, an electric current is applied from the control unit through the terminal strips 33a, 33a, pigtail harnesses 31d, 31e, electricity-feeding brushes 31a, 31b, and slip rings 26a, 26b to each of coils 18 of electric motor 8. Hence, motor output shaft 13 is driven. Then, the output rotation from the motor output shaft is reduced by means of the speed reducer 12, and thus the reduced speed (in other words, the multiplied torque) is transmitted to the camshaft 2.

That is to say, when eccentric shaft 39 rotates eccentrically according to rotation of motor output shaft 13, each of rollers 48 moves (rolls) and relocates from one of two adjacent internal teeth 19a, 19a of internal-tooth structural portion 19 to the other with one-tooth displacement per one complete revolution of motor output shaft 13, while being radially guided by the associated roller-holding hole 41b of cage 41. By way of the repeated relocations of each of rollers 48 every revolutions of motor output shaft 13, these rollers move in the circumferential direction with respect to the internal-tooth structural portion, while being held in rolling-contact with the middle ball bearing outer ring. By means of the rolling-contact of each of rollers 48, the output rotation from motor output shaft 13 is reduced and thus the reduced speed (in other words, the multiplied torque) is transmitted to the driven member 9. By the way, the reduction ratio of this type of speed reducer can be arbitrarily set depending on the difference between the number of internal teeth 19a and the number of rollers 48.

As discussed above, camshaft 2 is rotated in a normal-rotational direction or in a reverse-rotational direction relatively to the timing sprocket 1, and thus a relative-rotational phase of camshaft 2 to timing sprocket 1 is changed or converted, and as a result conversion control for intake valve open timing (IVO) and intake valve closure timing (IVC) to the phase-advance side or to the phase-retard side can be achieved.

By the way, a maximum phase-conversion position of camshaft 2 relative to timing sprocket 1 in the normal-rotational direction or in the reverse-rotational direction is restricted by abutment between the counterclockwise edge of protruding stopper 61b and the clockwise edge 2c of stopper groove 2b or abutment between the clockwise edge of protruding stopper 61b and the counterclockwise edge 2d of stopper groove 2b.

Therefore, the intake-valve open/closure timing can be converted into a maximum phase-advance side or into a maximum phase-retard side. This contributes to the improved fuel economy and enhanced engine power output.

Also, when the detected unit 50 of angle sensor 35 rotates according to rotation of motor output shaft 13 of electric motor 8, an induced current is produced in the detecting unit 51. By the electromagnetic induction action, integrated circuit 54 detects the rotational angle of motor output shaft 13. The control unit detects or derives the current rotational angle position of motor output shaft 13 from the detected signal. The control unit outputs a rotation-driving signal, determined based on the detected rotational angle position and the rotational position of the crankshaft, to the electric motor 8. Hence, the relative-rotational phase of camshaft 2 to the crankshaft, suited to the current engine operating condition, can be controlled accurately.

In the shown embodiment, reinforcing plate 28a having a higher elastic modulus than the synthetic resin material is molded and fixed, in a buried state, inside of the synthetic resin material of cover main body 28, thus enhancing the entire rigidity of cover main body 28. Hence, even when oscillations produced during driving of the engine are transmitted to the cover main body 28, the occurrence of large oscillations of the cover main body 28 can be suppressed. As a result, it is possible to suppress fluctuations in the minute clearance C between the detected rotor 52 and the bottom wall of the recessed groove 36a.

With the cover member installed on a chain case (not shown), hitherto, there was a tendency for the cover member to deform or deflect owing to the thermal expansion difference between the chain case and the cover member, thus causing a degradation in the rotation detection accuracy. In contrast, in the case of the cover member of the embodiment, the reinforcing plate 28a is made of a material having a less linear expansion coefficient than the synthetic resin material, and thus the entire thermal expansion of the cover main body 28 can be suppressed. Hence, as a whole, the deflection of the cover member, occurring owing to the thermal expansion difference of the cover main body 28 relative to the chain case (not shown) can be suppressed, and thus fluctuations in the minute clearance C can be suppressed. As a result of this, it is possible to suppress a degradation in the rotational angle detection accuracy of angle sensor 35.

During usual rotation, metal abrasion powder (metal wear debris) produced by sliding contact of slip rings 26a, 26b with the top end faces of electricity-feeding brushes 31a, 31b owing to rotation of motor output shaft 13 tends to scatter toward the outside of the housing main body 5a by a centrifugal force. However, when the engine is stopped or started up, there is a possibility that the abrasion powder is shaken off from the upper side and thus the shaken-off abrasion powder flows from the upside of the outer peripheral surface of the support section 50a of the detected unit 50 into the detected rotor 52.

In the shown embodiment, the top end section 50b of the support section 50a of the detected unit 50 is arranged to be inserted into the recessed groove 36a. Thus, the detected rotor 52 is laid out and configured such that the position of the detected rotor is offset outward (toward the side of cover portion 29) from sliding-contact positions between the slip ring 26a and electricity-feeding brush 31a and between the slip ring 26b and electricity-feeding brush 31b. Hence, the detected rotor 52 is housed or covered by the inner peripheral surfaces of recessed groove 36a and large-diameter groove 36b. Therefore, it is possible to sufficiently suppress an adhesion of the metal abrasion powder to the detected rotor 52.

In particular, in the embodiment, the recessed groove 36a and the large-diameter groove 36b are constructed as a labyrinth groove. By virtue of the labyrinth effect, it is possible to prevent the shaken-off metal abrasion powder from flowing toward the top end section 50b of the support section 50a. Hence, it is possible to sufficiently suppress the flow of metal abrasion powder to the side of the detected rotor 52.

As a result of this, it is possible to suppress a degradation in the rotation detection accuracy of angle sensor 35, which may be caused by the influence of metal abrasion powder. This contributes to the enhanced durability.

Additionally, in the embodiment, the cover member 4 is formed into a thin-walled (low-profile) shape in axial width (axial thickness), and thus it is possible to sufficiently shorten the entire axial length of the valve timing control device. This contributes to the downsizing of the device, that is, the enhanced mountability of the device within the engine room.

Furthermore, as discussed previously, the top end section 50b of the support portion 50a of the detected unit 50 is housed or held in the recessed groove 36a such that the top end section is axially fitted or inserted into the recessed groove. This also contributes to the shortened entire axial length of the device.

While the foregoing is a description of the preferred embodiments carried out the invention, it will be understood that the invention is not limited to the particular embodiments shown and described herein, but that various changes and modifications may be made. For instance, the material, the size, and the shape of the previously-discussed reinforcing plate may be arbitrarily changed depending on the technical specification and the like. Also, a material of the reinforcing plate is not always a metal material. In lieu thereof, the reinforcing plate may be made of any material having a less linear expansion coefficient and a higher elastic modulus than the synthetic resin of the cover member, for example, another synthetic resin material or a ceramic material.

In the shown embodiment the timing sprocket serves as a first member. In lieu thereof, a timing pulley may be used as a first member.

External factors, by which the cover member are affected, are not always limited to driving oscillations. Temperature changes as well as oscillations may be included in such external factors.

The invention claimed is:

1. A variable valve device for an internal combustion engine for varying operating characteristics of engine valves by changing a relative rotational phase of a second member to a first member comprising:
    an electric motor configured to rotate the second member relatively to the first member by rotating a motor output shaft;
    a cover member provided to cover at least a part of the electric motor; and
    a rotational angle detection mechanism comprising a detected unit provided on the motor output shaft and a detecting unit provided on the cover member so as to be opposed to the detected unit through a minute clearance for detecting a rotational angle position of the motor output shaft,
  wherein the cover member has a synthetic resin material and a deformation suppression member molded inside of the synthetic resin material and having a higher elastic modulus than the synthetic resin material.

2. A variable valve device for an internal combustion engine as claimed in claim 1, wherein:
    the deformation suppression member is made of a material having a less linear expansion coefficient than the synthetic resin material forming the cover member.

3. A variable valve device for an internal combustion engine as claimed in claim 2, wherein:
    the deformation suppression member is made of a metal material.

4. A variable valve device for an internal combustion engine as claimed in claim 1, wherein:
    the rotational angle detection mechanism comprises an electromagnetic induction angle sensor;
    the detecting unit is arranged to be opposite to the motor output shaft with the deformation suppression member sandwiched between them; and
    the deformation suppression member has a through hole formed at a position of the deformation suppression member conformable to the detecting unit.

5. A valve timing control device for an internal combustion engine for varying operating characteristics of engine valves by changing a relative rotational phase of a second member to a first member comprising:
    an electric motor installed on the first member and configured to rotate the second member relatively to the first member through a motor output shaft;
    a speed reducer provided for reducing a rotational speed of the electric motor and for transmitting the reduced rotational speed to the second member;
    a cover member provided to cover at least a part of the electric motor; and
    a rotational angle detection mechanism comprising a detected unit provided on the motor output shaft and a detecting unit provided on the cover member so as to be opposed to the detected unit through a minute clearance for detecting a rotational angle position of the motor output shaft,
  wherein the cover member has a synthetic resin material and a reinforcing plate molded inside of the synthetic resin material and having a higher rigidity than the synthetic resin material.

6. A valve timing control device for an internal combustion engine as claimed in claim 5, wherein:
    the reinforcing plate is made of a material having a less linear expansion coefficient and a higher elastic modulus than the synthetic resin material of the cover member.

7. A valve timing control device for an internal combustion engine as claimed in claim 6, wherein:
    the rotational angle detection mechanism comprises an electromagnetic induction angle sensor.

8. A valve timing control device for an internal combustion engine as claimed in claim 5, wherein:
    the reinforcing plate is made of a metal material.

9. A valve timing control device for an internal combustion engine as claimed in claim 8, wherein:
    the reinforcing plate has a through hole filled with the synthetic resin material and formed at a position of the reinforcing plate conformable to the detecting unit; and
    the detecting unit is provided on an outside face of the synthetic resin material filling in the through hole of the cover member, facing away from the motor output shaft.

10. A valve timing control device for an internal combustion engine as claimed in claim 5, wherein:
    the detected unit has a non-circular magnetic substance; and
    the detecting unit has an oscillating circuit that produces a magnetic field and a receiving circuit that detects a magnetic field generated from the magnetic substance of the detected unit.

11. A valve timing control device for an internal combustion engine as claimed in claim 10, wherein:
    the detecting unit has a printed wiring board, and the oscillating circuit and the receiving circuit formed on the printed wiring board.

12. A valve timing control device for an internal combustion engine as claimed in claim 5, wherein:
    the reinforcing plate comprises a synthetic resin plate having a less linear expansion coefficient and a higher elastic modulus than the synthetic resin material used for the cover member.

13. A valve timing control device for an internal combustion engine as claimed in claim 5, wherein:
    the cover member is provided with electricity-feeding brushes for electricity-feeding to the electric motor and a power supply connector for electric-current supply to the electricity-feeding brushes; and
    at least a part of each of harnesses that connect the electricity-feeding brushes to respective terminals of the power supply connector is provided at a position of the reinforcing plate being opposite to the electric motor.

14. A valve timing control device for an internal combustion engine as claimed in claim 5, wherein:
the detecting unit and the detected unit are both arranged on an axis of the motor output shaft.

15. A valve timing control device for an internal combustion engine as claimed in claim 5, wherein:
the cover member has electricity-feeding brushes for electricity-feeding to the electric motor;
the electric motor has slip rings kept in sliding-contact with the respective electricity-feeding brushes; and
the electricity-feeding brushes are slidably installed in retaining holes provided in the cover member.

16. A valve timing control device for an internal combustion engine as claimed in claim 13, wherein:
the cover member is provided with a signal connector adapted to output a rotational angle signal detected by the detecting unit to a control unit; and
the synthetic resin material is interposed between conductive materials of the signal connector and the reinforcing plate.

17. A valve timing control device for an internal combustion engine as claimed in claim 13, wherein:
the reinforcing plate has a cutout section configured along a radial direction and formed at a part of an outer periphery of the reinforcing plate; and
at least a part of each of the conductive materials is arranged along the radial direction inside of the cutout section.

18. A valve timing control device for an internal combustion engine as claimed in claim 5, wherein:
the cover member is formed with a plurality of fixing holes adapted to fix the cover member to a cylinder head or a chain case with bolts.

19. A valve timing control device for an internal combustion engine as claimed in claim 18, wherein:
the fixing holes are defined by respective cylindrical metal sleeves buried in the synthetic resin material of the cover member.

20. A valve timing control device for an internal combustion engine as claimed in claim 19, wherein:
the sleeves are provided at respective positions spaced apart from the reinforcing plate.

* * * * *